US012682015B2

(12) United States Patent
Zlotnick

(10) Patent No.: US 12,682,015 B2
(45) Date of Patent: Jul. 14, 2026

(54) ENSEMBLE VOTING CLASSIFIERS USING ADJUSTED THRESHOLDS

(71) Applicant: International Business Machines Corporation, Armonk, NY (US)

(72) Inventor: Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 17/190,972

(22) Filed: Mar. 3, 2021

(65) Prior Publication Data

US 2022/0284243 A1    Sep. 8, 2022

(51) Int. Cl.
G06F 18/241 (2023.01)
G06N 20/20 (2019.01)

(52) U.S. Cl.
CPC ........... G06F 18/241 (2023.01); G06N 20/20 (2019.01)

(58) Field of Classification Search
CPC .............................. G06F 18/241; G06N 20/20
See application file for complete search history.

(56) References Cited

U.S. PATENT DOCUMENTS

| | | | | | |
|---|---|---|---|---|---|
| 5,267,326 | A | * | 11/1993 | Rao | ......................... G06V 30/15 |
| | | | | | 382/179 |
| 8,768,868 | B1 | * | 7/2014 | Cheng | ...................... G06N 5/00 |
| | | | | | 706/12 |

| | | | | |
|---|---|---|---|---|
| 2019/0238396 | A1 | * | 8/2019 | Tedaldi ............... H04L 41/0636 |
| 2020/0007412 | A1 | | 1/2020 | Cruz Mota et al. |
| 2020/0184278 | A1 | * | 6/2020 | Zadeh ..................... G06N 3/044 |
| 2021/0081899 | A1 | * | 3/2021 | Venkatasubramanian ................... G06N 20/20 |
| 2021/0241048 | A1 | * | 8/2021 | Rezaei ................. G06V 10/774 |
| 2021/0406346 | A1 | * | 12/2021 | Shiue ..................... G06N 20/20 |
| 2022/0157458 | A1 | * | 5/2022 | Mohiuddin ............ G16H 10/40 |
| 2022/0236285 | A1 | * | 7/2022 | Kampf ............... G01N 33/6863 |
| 2022/0289854 | A1 | * | 9/2022 | Freeman ........... C07K 16/2866 |
| 2022/0396632 | A1 | * | 12/2022 | Novobrantseva ...... A61K 40/24 |
| 2023/0075965 | A1 | * | 3/2023 | Mitsiades .......... A61K 40/4202 |

FOREIGN PATENT DOCUMENTS

KR        10-2108050 B1      5/2020

OTHER PUBLICATIONS

Anonymous et al., "Lazy method for fast voting—Lazy method for fast voting-based ensemble scoring based ensemble scoring", IP.com Electronic Publication, May 27, 2015, 9 pages.

(Continued)

*Primary Examiner* — Jennifer N Welch
*Assistant Examiner* — Quoc Ly Phu Phung
(74) *Attorney, Agent, or Firm* — Samuel A. Waldbaum

(57)        ABSTRACT

An example system includes a processor to receive training data used to train an ensemble voting classifier. For each classifier in the ensemble voting classifier, the processor can also set a classification score of a positive training item as a threshold. The processor can further adjust a threshold of at least one of the classifiers based on an analysis of a vote contribution of each classifier on the votes on the training data. The threshold of the at least one of the classifiers is adjusted to increase a voting specificity without impacting sensitivity with respect to the training data.

20 Claims, 9 Drawing Sheets

(56) References Cited

OTHER PUBLICATIONS

Chen, James J. et al., "The Use of Decision Threshold Adjustment in Classification for Cancer Prediction", Semantic Scholar , 2005, 26 pages.

Cox, Robert et al., "An Investigation into the Effect of Ensemble Size and Voting Threshold on the Accuracy of Neural Network Ensembles", Australasian Joint Conference on Artificial Intelligence, AI 1999, Advanced Topics in Artificial Intelligence, Jan. 1, 1999, 10 pages.

Gharroudi, Ouadie et al., "Ensemble Multi-label Classification: A Comparative Study on Threshold Selection and Voting Methods", 2015 IEEE 27th International Conference on Tools with Artificial Intelligence, Jan. 7, 2016, 8 pages.

Li, Chaofeng et al., "False-Positive Reduction on Lung Nodules Detection in Chest Radiographs by Ensemble of Convolutional Neural Networks", IEEE Access (vol. 6), Mar. 19, 2018, 11 pages.

Lipton, Zachary C. et al., "Optimal Thresholding of Classifiers to Maximize F1 Measure", Joint European Conference on Machine Learning and Knowledge Discovery in Databases, ECML PKDD 2014: Machine Learning and Knowledge Discovery in Databases, May 26, 2015, 19 pages.

Meng, Yuxin et al., "Enhancing False Alarm Reduction Using Voted Ensemble Selection in Intrusion Detection", International Journal of Computational Intelligence Systems, vol. 6, No. 4, Jul. 2013, 13 pages.

* cited by examiner

100A

116

120

Input Data

Ensemble Voting Classifier

118

Final Score Calculator

Classifiers

104

Adjusted Thresholds

114

122

Final Score

100B

Receive Training Data — 202

Generate Threshold Table Including Sorted List of Thresholds for Each of Number of Classifiers in Ensemble Voting Classifier — 204

Set Index Into Threshold Table to Set Threshold for Each of Classifiers — 206

Adjust Threshold Indices of Classifiers Based on Analysis of Vote Contribution of Each Classifier on Votes on Training Data — 208

200

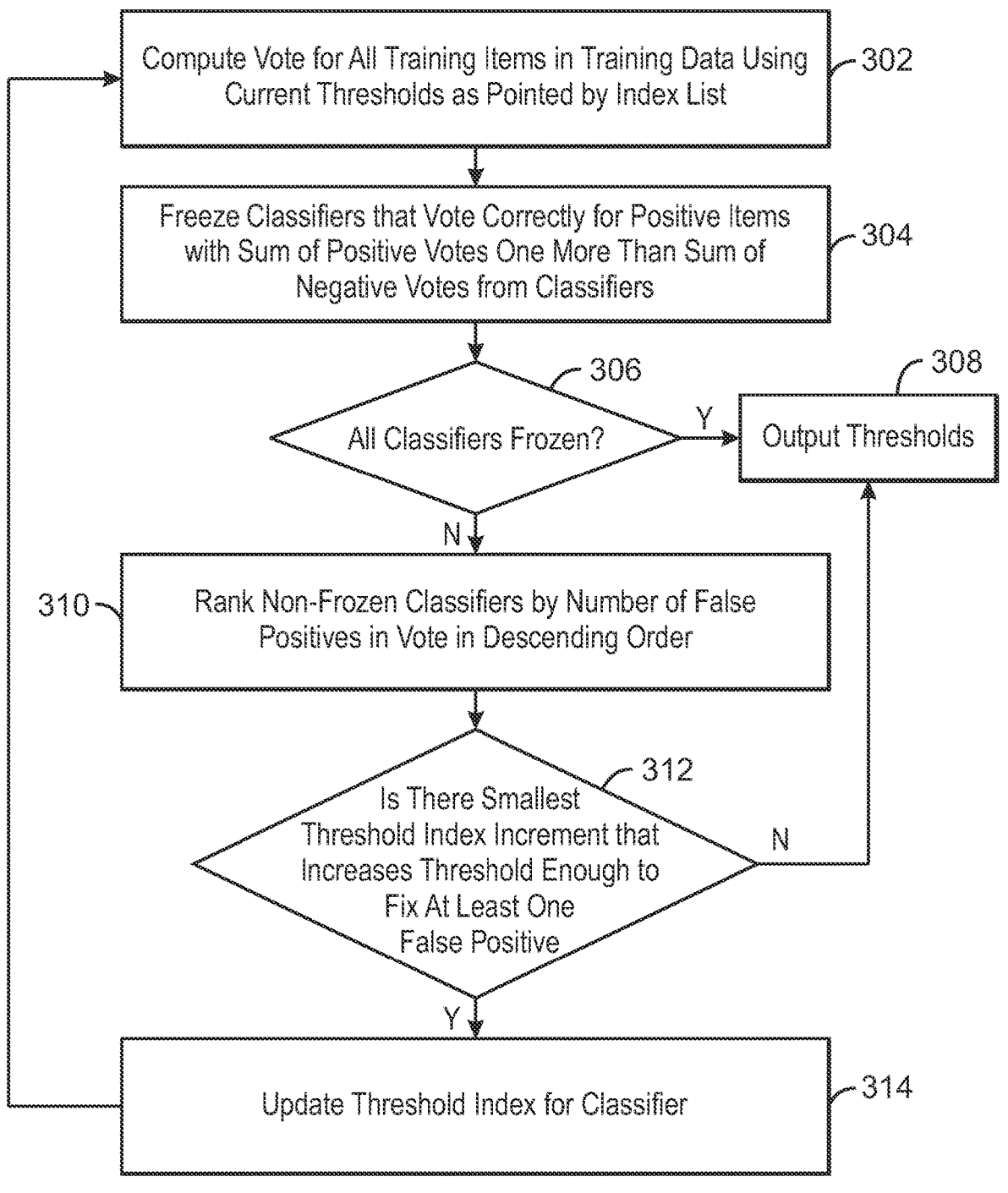

302

Compute Vote for All Training Items in Training Data Using Current Thresholds as Pointed by Index List

304

Freeze Classifiers that Vote Correctly for Positive Items with Sum of Positive Votes One More Than Sum of Negative Votes from Classifiers

306

All Classifiers Frozen?

Y

308

Output Thresholds

N

310

Rank Non-Frozen Classifiers by Number of False Positives in Vote in Descending Order

312

Is There Smallest Threshold Index Increment that Increases Threshold Enough to Fix At Least One False Positive

N

Y

314

Update Threshold Index for Classifier

Figure 4:
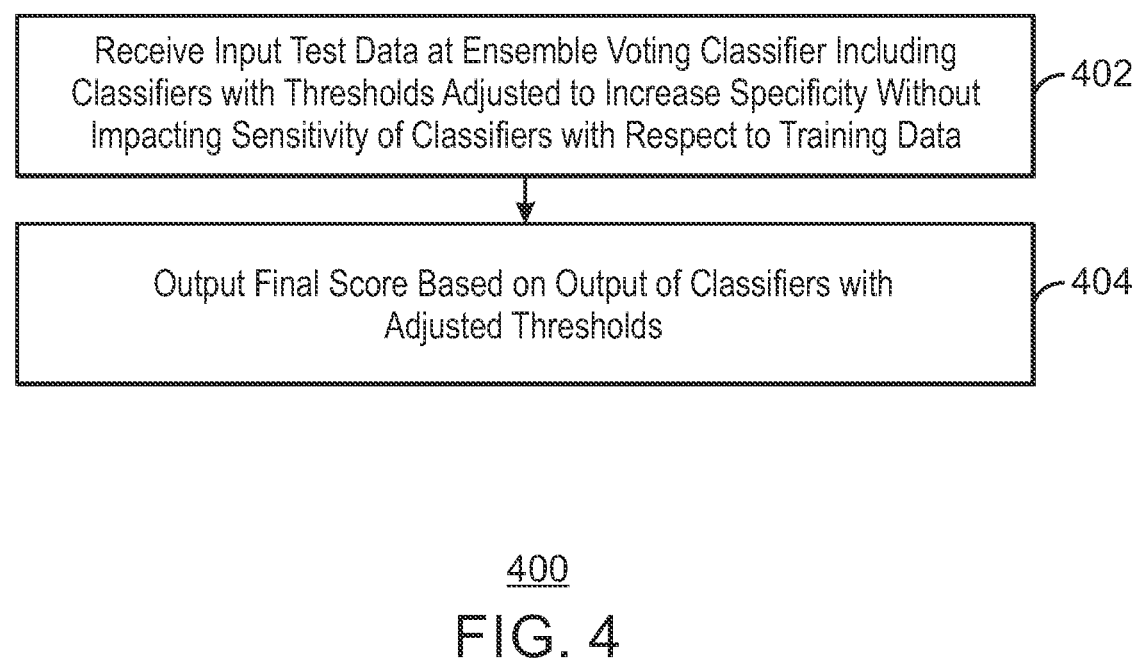

Receive Input Test Data at Ensemble Voting Classifier Including Classifiers with Thresholds Adjusted to Increase Specificity Without Impacting Sensitivity of Classifiers with Respect to Training Data ⌐ 402

Output Final Score Based on Output of Classifiers with Adjusted Thresholds ⌐ 404

ENSEMBLE VOTING CLASSIFIERS USING ADJUSTED THRESHOLDS

BACKGROUND

The present techniques relate to classifiers. More specifically, the techniques relate to ensemble voting classifiers.

Classification ensembles are predictive classifiers that use a combination of multiple classifiers to increase predictive performance. For example, the mean of the output scores of the classifiers may be used as a final score of the classification ensemble. If the final score exceeds some classification threshold, then a particular classification may result. A different classification may result if the score does not exceed the threshold. However, if the scores of the classifiers are not distributed similarly, then the mean may not be very accurate for prediction because the distributions may not be related. Thus, mean based classification ensembles are sensitive to calibration.

In some examples, the weighted combination of the multiple classifiers may be achieved using voting. For example, each of the multiple classifiers may output a true or false vote, and a higher vote count for a particular classification may result in a final result of the highest voted classification. Such combination of classifiers is referred to herein an ensemble voting classifier. A vote from a classifier inside an ensemble voting classifier may be based on a voting threshold being exceeded. These thresholds may be set separately for each classifier, so that results of classifying a training set meet requirements. By setting individual voting thresholds, the voting result may be better, however such methods may not provide any way to control both sensitivity and specificity. Moreover, such individually set voting thresholds assume that applying same thresholds to production items will yield same results.

In addition, applying genetic optimization directly to voting thresholds may not yield acceptable results. Furthermore, although using a method of threshold lists may yield some good results, these results may be over-fitted to the training set. Thus, no methods provide a systematic way to set thresholds that achieve maximal specificity in given sensitivity and also give good results in production.

SUMMARY

According to an embodiment described herein, a system can include processor to receive training data used to train an ensemble voting classifier. The processor can, for each classifier in the ensemble voting classifier, set a classification score of a positive training item as a threshold. The processor can also adjust a threshold of at least one of the classifiers based on an analysis of a vote contribution of each classifier on the votes on the training data. The threshold of the at least one of the classifiers is adjusted to increase a voting specificity without impacting sensitivity with respect to the training data. The system may thus enable the reduction of the number of false positive classifications yielded by an ensemble of classifiers, without impacting the number of true positives. Preferably, the thresholds are initially set based on a received target sensitivity. In this embodiment, the system enables flexibility with regards to sensitivity of the resulting ensemble voting classifier. Optionally, the number of classifiers includes different types of classifiers. In this embodiment, the system enables flexibility with regards to the classifiers used in the ensemble voting classifier. Optionally, the number of classifiers includes two of the same type of classifier trained using different training parameters. In this embodiment, the system enables increase a voting specificity without impacting sensitivity of an ensemble voting classifier using multiple instances of the same classifier. Optionally, the thresholds correspond to a sensitivity of less than 100% on the training data. In this embodiment, the system enables flexibility with regards to sensitivity of the resulting ensemble voting classifier.

According to another embodiment described herein, a method can include receiving, via a processor, training data. The method can further include generating, via the processor, a threshold table including a sorted list of thresholds for each of a number of classifiers in an ensemble voting classifier. The method can also further include setting an index into the threshold table to set a threshold for each of the classifiers. The method can also include adjusting, via the processor, a threshold index of a classifier of the classifiers based on an analysis of a vote contribution of each classifier on votes on the training data. Optionally, generating the threshold table includes sorting the thresholds for each of the classifiers based on ascending list of scores of each classifier for positive items. In this embodiment, the method enables scores of each classifier for positive items to be used as thresholds. Optionally, adjusting the threshold index includes computing a vote for all training items using a current set of thresholds as pointed by the threshold index. In this embodiment, the method enables iterative adjustment of the thresholds. Optionally, adjusting the threshold index includes freezing classifiers that vote correctly for a positive item that has a sum of positive votes that is one more vote greater than the sum of negative votes from the classifiers. In this embodiment, the method enables sensitivity with respect to the training data to be maintained. Optionally, adjusting the threshold index includes, in response to detecting that not all classifiers are frozen, ranking non-frozen classifiers by a number of false positives in the vote in descending order, finding a smallest threshold index increment to increase a threshold of a classifier to fix at least one false positive, and updating the threshold index for the classifier. In this embodiment, the method enables increasing a voting specificity of one of the classifiers. Optionally, adjusting the threshold index includes updating a classifier with a higher ranking based on false positives in response to detecting a number of classifiers with at least one false positive fixed. In this embodiment, the method enables selection of a particular classifier when two or more classifiers are potentially adjustable. Preferably, adjusting the threshold index is limited by a maximum index increment. In this embodiment, the method enables reduced over-fitting. Optionally, the method includes truncating the sorted listed of thresholds for each of the classifiers above a list threshold. In this embodiment, the method further enables reduced over-fitting.

According to another embodiment described herein, a computer program product for ensemble voting classification can include computer-readable storage medium having program code embodied therewith. The computer readable storage medium is not a transitory signal per se. The program code executable by a processor to cause the processor to receive training data. The program code can also cause the processor to generate a threshold table including a sorted listed of thresholds for each of a number of classifiers in an ensemble voting classifier. The program code can also cause the processor to set an index into the threshold table to set a threshold for each of the classifiers. The program code can also cause the processor to adjust a threshold index of at least one of the classifiers based on an analysis of a vote contribution of each classifier on votes on the training data.

Optionally, the program code can also cause the processor to perform any of the actions of the method embodiment described above with similar advantages.

BRIEF DESCRIPTION OF THE SEVERAL VIEWS OF THE DRAWINGS

FIG. 3 is a block diagram of an example method that can calculate thresholds for an ensemble of classifiers;

FIG. 4 is a block diagram of an example method that can generate final scores for classifying objects using classifiers with interactively adjusted thresholds;

DETAILED DESCRIPTION

According to embodiments of the present disclosure, a system can include a processor to receive training data used to train an ensemble voting classifier. For each classifier in the ensemble voting classifier, the processor can, set a classification score of a positive training item as a threshold. The processor can further adjust a threshold index of at least one of the classifiers based on an analysis of a vote contribution of each classifier on the votes on the training data. The threshold of the at least one of the classifiers is adjusted to increase a voting specificity without impacting sensitivity with respect to the training data. Thus, embodiments of the present disclosure enable the reduction of the number of false positive classifications yielded by an ensemble of classifiers, without impacting the number of true positives.

Figure 1A:
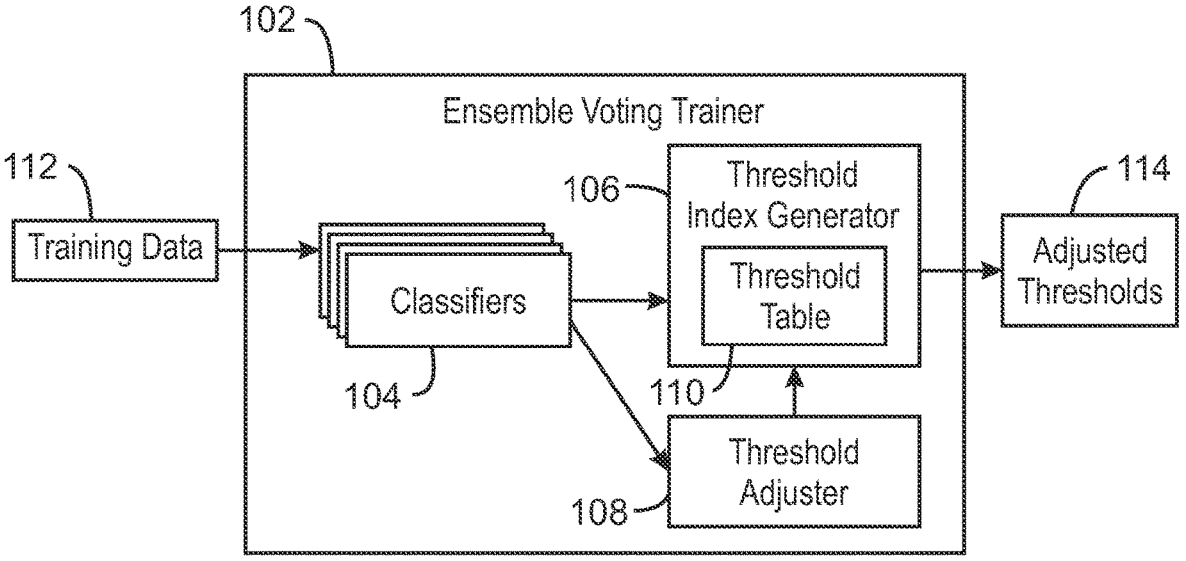
FIG. 1A is a block diagram of an example system for training that can adjust thresholds used to perform ensemble voting classification using adjusted thresholds.

With reference now to FIG. 1A, a block diagram shows an example system for training that can adjust thresholds used to perform ensemble voting classification using adjusted thresholds. The example system is generally referred to by the reference number 100A. FIG. 1A includes an ensemble voting trainer 102. The ensemble voting trainer 102 includes classifiers 104. In various examples, any number of classifiers 104 may be used. In some examples, the classifiers 104 may be classifiers trained using different algorithms. In various examples, the classifiers 104 may be classifiers of the same type but using different values for parameters. The ensemble voting trainer 102 also includes a threshold index generator 106 communicatively coupled to the classifiers 104. The ensemble voting trainer 102 also includes a threshold adjuster 108 communicatively coupled to the classifiers 104 and the threshold index generator 106. The threshold index generator 106 also includes a threshold table 110. For example, the threshold table 110 includes a set of thresholds for each of the classifiers 104. The system 100A also includes training data 112. The system 100A further includes a set of adjusted thresholds 114 shown being output by the final score calculator 106 of the ensemble voting trainer 102.

In the example of FIG. 1A, the ensemble voting trainer 102 can use training data 112 to generate adjusted thresholds 114 to be used in an ensemble voting classifier. For example, the output adjusted thresholds 114 can be used in the system 100B of FIG. 1B.

Still referring to FIG. 1A, in various examples, a threshold index generator 106 may generate a set of thresholds such that an item whose score is greater than or equal to the threshold is classified as positive. For example, if a target ensemble voting classifier includes a total of ten classifiers 104, then ten thresholds may be set in total. In various examples, the threshold index generator 106 may set the thresholds in the threshold table 110 to provide a high sensitivity. The threshold adjuster 108 may then individually adjust the thresholds pointed by an index in the threshold table 110 to increase specificity, while ensuring that the selected thresholds maintain a high sensitivity.

As one example, a set of mammograms may be input as training data 112. The mammograms may include x-ray scans including one or more tumors to be classified, along with labels indicating whether such tumors are cancerous or benign growths. In this example, the sensitivity of a classifier 104 may be the proportion of malignant tumors detected by the classifier 104 with respect to the actual number of malignant tumors in the input samples. For example, a sensitivity of 99% indicates that 1 in 100 malignant tumor detections are missed by the classifier 104. Similarly, in this example, a specificity refers to the number of benign tumors that are classified as benign by a classifier 104. Thus, in this example, a specificity of 40% indicates that 40 in 100 benign tumors may be correctly classified as benign by the classifier 104. Therefore, in such example, 40% of total mammograms would not need to be reviewed and confirmed manually, and would still only result in one missed malignant tumor for every 100 cancerous tumors. Increasing the specificity by adjusting the thresholds used in the threshold table 110 may therefore reduce total cases needing further review and thereby further automate the process. For example, the higher the threshold is adjusted, the lower the sensitivity and the higher the resulting specificity of the particular classifier 104.

For any classifier 104, the threshold values that may thus affect the sensitivity of a given classifier 104 are the scores of the classifier 104 for the positive items in the training data 114 set. In various examples, for every classifier 104, an index generator 106 can create a threshold table 110 that includes an ascending sorted list of thresholds. For example, the threshold table 110 for seven classifiers may appear as shown in the table below:

TABLE 1

| Example Threshold Table | | | | | | | |
|---|---|---|---|---|---|---|---|
| Thresh. Index No. | Classi-fier 1 | Classi-fier 2 | Classi-fier 3 | Classi-fier 4 | Classi-fier 5 | Classi-fier 6 | Classi-fier 7 |
| 0 | 0.346 | 0.327 | 0.354 | 0.288 | 0.359 | 0.477 | 0.271 |
| 1 | 0.622 | 0.414 | 0.391 | 0.477 | 0.365 | 0.66 | 0.499 |
| 2 | 0.633 | 0.448 | 0.395 | 0.519 | 0.406 | 0.663 | 0.499 |
| 3 | 0.657 | 0.51 | 0.416 | 0.544 | 0.406 | 0.676 | 0.549 |
| 4 | 0.693 | 0.527 | 0.431 | 0.55 | 0.41 | 0.713 | 0.572 |
| 5 | 0.697 | 0.554 | 0.433 | 0.558 | 0.437 | 0.724 | 0.581 |
| 6 | 0.706 | 0.556 | 0.447 | 0.602 | 0.437 | 0.727 | 0.593 |
| 7 | 0.706 | 0.583 | 0.471 | 0.613 | 0.461 | 0.737 | 0.593 |

TABLE 1-continued

| | Example Threshold Table | | | | | | |
|---|---|---|---|---|---|---|---|
| Thresh. Index No. | Classi- fier 1 | Classi- fier 2 | Classi- fier 3 | Classi- fier 4 | Classi- fier 5 | Classi- fier 6 | Classi- fier 7 |
| 8 | 0.72 | 0.591 | 0.507 | 0.639 | 0.482 | 0.739 | 0.593 |
| 9 | 0.737 | 0.6 | 0.547 | 0.642 | 0.494 | 0.739 | 0.604 |

For example, the thresholds may be the scores of each of the classifiers 104 for positive input items in the training data 112. Any threshold higher than such scores would cause each classifier 104 to misclassify this positive input, but possibly classify negative inputs correctly. The sorted list in the threshold table 110 is therefore be a finite list of scores at which a corresponding threshold change would change the sensitivity of each classifier 104. The threshold index generator 106 can then maintain an array of indices that records which item in each sorted list is the current threshold per classifier. In some examples, the sorted list can be truncated to avoid over-fitting. Over-fitting of a classifier refers to a state in which a classifier performs well on training data, but performs poorly on actual production data, also referred to herein as test data, received after training. For example, the sorted list can be truncated above an N-th threshold. As one example, the sorted list can be truncated above N=10 thresholds. In various examples, all the classifiers 104 may start with a first item in the sorted list to ensure 100% sensitivity. In some examples, the first item may be the smallest item in the sorted list. For example, the classifiers 104 may start with a threshold at index=0 indicating the first item in the list, which may correspond to a 100% sensitivity. In some examples, the classifiers 104 may start with a threshold that corresponds to a later item in the list. For example, a target sensitivity may be below 100%, such as 90% or 95% sensitivity. In this example, if the target sensitivity is below 100%, then the initial values of the indices corresponding to initial thresholds used may be higher than 0. For example, the final score calculator 106 can use an initial threshold with an index of 1 or 2, which may correspond to a target sensitivity of 95% and 90%, respectively. Alternatively, in some examples, the scores can be inversed, such that the lower scores are for the positive cases and the first item may be the largest item in the sorted list.

In various examples, the threshold adjuster 108 may then iteratively adjust the thresholds for the classifiers 104. For example, the threshold adjuster 108 may iterate on the following actions. First, the threshold adjuster 108 may compute the vote for all the training items in the training data 112 using the current thresholds as pointed by an index list. For example, the current thresholds may be set for a particular sensitivity as discussed above. Then, the threshold adjuster 108 may find the classifiers 104 that vote correctly for a positive item whose sum of positive votes is only one vote more than the sum of negative votes from the classifiers 104. The threshold of this subset of the classifiers 104 cannot be changed without impacting the voting result. Therefore, these thresholds of these classifiers 104 may be frozen so that the sensitivity of the classifiers is unchanged. As used herein, freezing thresholds refers to keeping the value of the threshold constant for a classifier during an adjustment of another classifier. If all of the thresholds for classifiers 104 are frozen, then the iterative process may stop. The current thresholds may be the resulting adjusted thresholds 114 used to calculate a final score during production, as described in FIG. 1B.

In some examples, if not all of the thresholds for classifiers 104 are frozen, then the threshold adjuster 108 may select one of the classifiers 104 that were not frozen and adjust the threshold of the selected classifier 104. In various examples, the threshold adjuster 108 may first rank the non-frozen classifiers by the number of false positives in the vote. The false positives may be negative samples that have scores above or equal to the threshold for a classifier 104. For example, the ranking for the classifiers 104 may be in descending order of false positives. In various examples, the threshold adjuster 108 may then find the smallest threshold index increment that increases the threshold enough for fixing at least one false positive in at least one classifier 104. Finding the smallest increment in this manner reduces impact on production data. For example, if one classifier 104 uses an increment of three index numbers to reduce a false positive, while another classifier 104 uses an increment of two index numbers to reduce a false positive, then the threshold adjuster 108 may select an increment of two index numbers assuming that no other classifier results in any reduction of a false positive from a single index number change. The threshold adjuster 108 may accordingly update the threshold index for the single classifier 104. In some examples, a maximum threshold increment may also be used. As one example, the smallest threshold index increment may be set to be not be larger than 10. Such a maximum threshold increment may also help reduce over-fitting in the classifier 104. If the same increment fixes at least one false positive in more than one classifier 104, then the threshold adjuster 108 may select the classifier 104 with the higher rank. In various examples, the threshold adjuster 108 may update the threshold index for the selected classifier 104 and the process may continue iterating as described above. If there is no such increment, then the iterative process may stop. The current thresholds may be output as the adjusted thresholds 114 to be used to calculate the final score on input data, as described in FIG. 1B. In this manner, the threshold adjuster 108 may increase the specificity of the resulting final score while maintaining the initially set sensitivity.

It is to be understood that the block diagram of FIG. 1A is not intended to indicate that the system 100A is to include all of the components shown in FIG. 1A. Rather, the system 100A can include fewer or additional components not illustrated in FIG. 1A (e.g., additional training data, classifiers, adjusted thresholds, or threshold indices, etc.). In some examples, a threshold table 110 may not be used. For example, the threshold adjuster 108 may select a best threshold combination without the use of a threshold table 110. In various examples, a genetic algorithm may also be used in the system 100A to generate initial thresholds for the threshold index 110. For example, the genetic algorithm may generate random lists of integers for the thresholds and evaluate the sensitivity and specificity and select a top k number of integers to use for thresholds. The genetic algorithm may then combine parts of the k number of integers to obtain new lists of integers to use as thresholds. In various examples, the thresholds obtained by the genetic algorithm may then be adjusted using the threshold adjuster 108 as described herein. In various examples, the genetic algorithm may also be used to find an optimal combination of indices in the threshold list of the threshold table 110 described above.

Figure 1B:
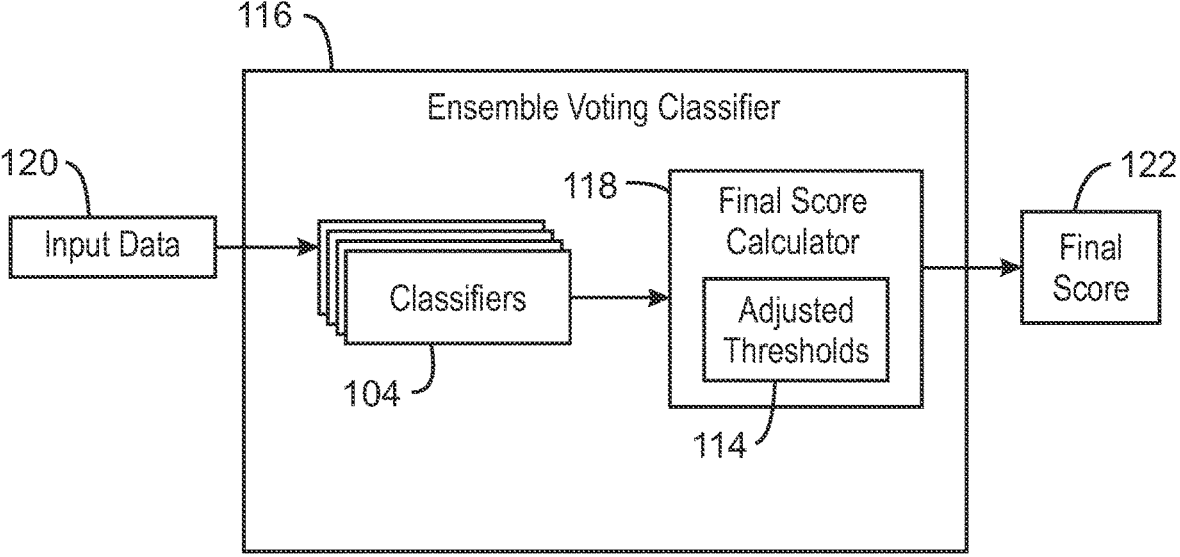
FIG. 1B is a block diagram of an example system that can perform ensemble voting classification using adjusted thresholds.

FIG. 1B is a block diagram of an example system that can perform ensemble voting classification using adjusted thresholds. The system 100B includes similarly referenced elements of FIG. 1A. The system 100B further includes an ensemble voting classifier 116 that includes a final score calculator 118. The final score calculator 118 includes a set of adjusted thresholds 114. For example, the adjusted thresholds 114 may be generated using system 100A of FIG. 1A. The system 100B also further includes input data 120 shown being input into the ensemble voting classifier 116, respectively. The system 100B also further includes a final score 122 generated by the ensemble voting classifier 116.

In various examples, the final score 122 can be used to classify the input data 120. For example, input data 120 resulting in a final score 122 that exceeds or equals a threshold may be classified in a particular manner. Otherwise, input data 120 resulting in a final score 122 that does not exceed or equal the threshold may be classified differently. In some examples, the final score 116 may be calculated based on a simple majority vote of the classifiers 104. For example, the final score 116 may be an indication of the classification result of the majority of the classifiers 104. In some examples, the final score 116 may be a binary output, such as a positive or negative classification. As one example, the final score 116 may indicate whether an input mammogram includes a malignant growth or not.

It is to be understood that the block diagram of FIG. 1B is not intended to indicate that the system 100B is to include all of the components shown in FIG. 1B. Rather, the system 100B can include fewer or additional components not illustrated in FIG. 1B (e.g., additional input data, classifiers, adjusted thresholds, or final scores, etc.).

Figure 2:
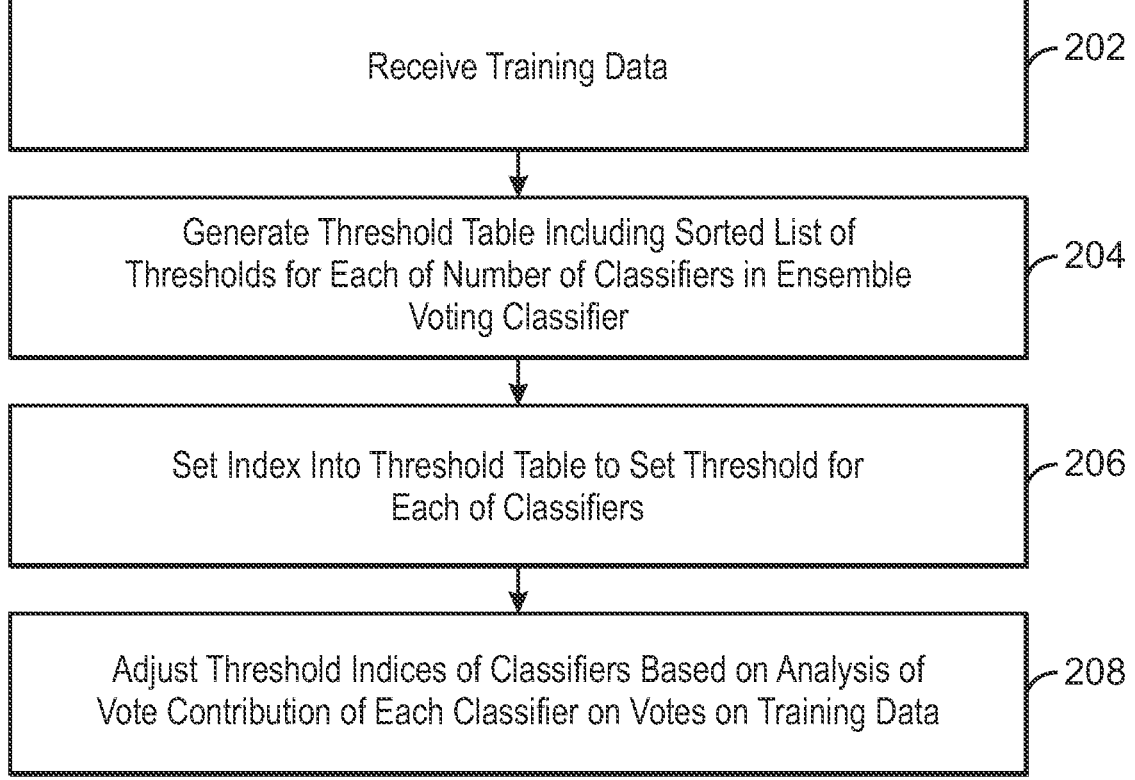
FIG. 2 is a block diagram of an example method that can iteratively adjust thresholds of an ensemble of classifiers.

FIG. 2 is a process flow diagram of an example method that can iteratively adjust thresholds of an ensemble of classifiers. The method 200 can be implemented with any suitable computing device, such as the computing device 300 of FIG. 3 and is described with reference to the system 100A of FIG. 1A. For example, the methods described below can be implemented by the processor 502 or the processor 802 of FIGS. 5 and 8.

At block 202, training data is received. For example, thresholds for each classifier may correspond to scores of positive items in the training data of the classifier. In some examples, a target sensitivity may also be received. For example, the target sensitivity may be 100% or any percentage less than 100%. The training data may be training data that was used to train the classifiers. Preferably, in some examples, the training data is different from the data that was used for training the classifiers.

At block 204, a threshold table including a sorted listed of thresholds is generated for each of a number of classifiers in an ensemble voting classifier. For example, for each classifier, the thresholds for each of the classifiers may be sorted based on ascending list of scores of each classifier for positive items. Thus, the thresholds may be sorted in a descending order of associated sensitivity of each score. In some examples, the sorted list may be truncated. For example, the list may be truncated above a list threshold. In various examples, the list threshold may be specified number of thresholds, such as 20, 30, 40, etc. As one example, an initial sorted list of hundreds of positive item scores may be truncated to an ascending list of 20 scores to be used as potential threshold values.

At block 206, an index is set into the threshold table to set a threshold for each of the classifiers. As one example, a score associated with 100% sensitivity may be at an index of 0 in the sorted list and a score associated with 90% sensitivity may be at an index of 2 in the sorted list.

At block 208, threshold indices of the classifiers are adjusted based on an analysis of a vote contribution of each classifier on votes on the training data. For example, the threshold index of each of the classifiers may be adjusted to increase specificity of each classifier without impacting voting sensitivity with respect to the training data. In some examples, the adjustment of the threshold index may be limited to a maximum index increment. As one example, the threshold indices may be adjusted using the method 300 of FIG. 3.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

FIG. 3 is a process flow diagram of an example method that can calculate thresholds for an ensemble of classifiers. The method 300 can be implemented with any suitable computing device, such as the computing device 500 of FIG. 5 and is described with reference to the system 100A of FIG. 1A. For example, the methods described below can be implemented by the processor 502 or the processor 802 of FIGS. 5 and 8.

At block 302, a vote is computed for all training items in training data using current thresholds as pointed by an index list. For example, the index list may be a threshold table including a sorted list of positive scores with index numbers ranked in ascending order of positive score.

At block 304, classifiers that vote correctly for positive items having a sum of positive votes one more vote greater than the sum of negative votes from the classifiers are frozen. For example, the thresholds of such classifiers cannot be further adjusted without flipping the classification and thereby affecting the sensitivity of the classifier. Therefore, the thresholds of such classifiers may remain unchanged. In some examples, classifiers that vote correctly for positive items having a sum of positive votes of more than one more vote greater than the sum of negative votes from the classifiers may also be frozen, If classifiers that participate in a vote that is weaker then K are frozen, then the larger K, and the less overfitting. However, the larger the value of K, the less improvement of the specificity there may be.

At diamond 306, a determination is made as to whether all the classifiers are frozen. If all the classifiers are frozen, then the method may proceed to block 308. Otherwise, if all the classifiers are not frozen, then the method may proceed to block 310.

At block 308, the thresholds are output. For example, the adjusted thresholds along with the initially frozen thresholds may be output to use in an ensemble voting classifier.

At block 310, non-frozen classifiers are ranked by the number of false positives in the vote in descending order. For example, non-frozen classifiers with higher number of false positives may be ranked higher than non-frozen classifiers with a lower number of false positives.

At diamond 312, a determination is made as to whether there is a smallest threshold index increment that increases the threshold enough to fix at least one false positive. If there is a smallest threshold index increment that increases the threshold enough to fix at least one false positive, then the method may continue at block 314. If there is not a smallest threshold index increment that increases the threshold enough to fix at least one false positive, then the method may continue at block 308. In some examples, a maximum threshold increment may also be used. As one example, the smallest threshold index increment may be set to be not be larger than 10. Such a maximum threshold increment may reduce overfitting in the classifier.

At block 314, a threshold index is updated for a classifier. For example, the threshold index of the classifier with the smallest threshold index increment that increases the threshold enough to fix at least one false positive in block 312 may be updated with the increment. In some examples, if two or more such classifiers are identified in block 312, then the classifier with a higher ranking in block 310 may be updated in response to detecting two or more such classifiers.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

FIG. 4 is a process flow diagram of an example method that can generate final scores for classifying objects using classifiers with interactively adjusted thresholds. The method 400 can be implemented with any suitable computing device, such as the computing device 500 of FIG. 5 and is described with reference to the system 100B of FIG. 1B. For example, the methods described below can be implemented by the processor 502 or the processor 802 of FIGS. 5 and 8.

At block 402, input test data is received at an ensemble voting classifier including a number of classifiers with thresholds adjusted to increase specificity without impacting sensitivity of the classifiers with respect to training data. For example, the training data may be different than the training data used to train the ensemble voting classifier. For example, the thresholds of the classifiers in the ensemble voting classifier may have been iteratively adjusted using the methods 200 or 300 of FIGS. 2 and 3.

At block 404, a final score based on the output of the classifiers with adjusted thresholds is output. For example, the final score may indicate a positive or a negative classification. In various examples, the final score may have a higher sensitivity and specificity than the scores of any of the individual classifiers of the ensemble voting classifier.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

In some scenarios, the techniques described herein may be implemented in a cloud computing environment. As discussed in more detail below in reference to at least FIGS. 5-8, a computing device configured to classify objects using classifiers with interactively adjusted thresholds may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
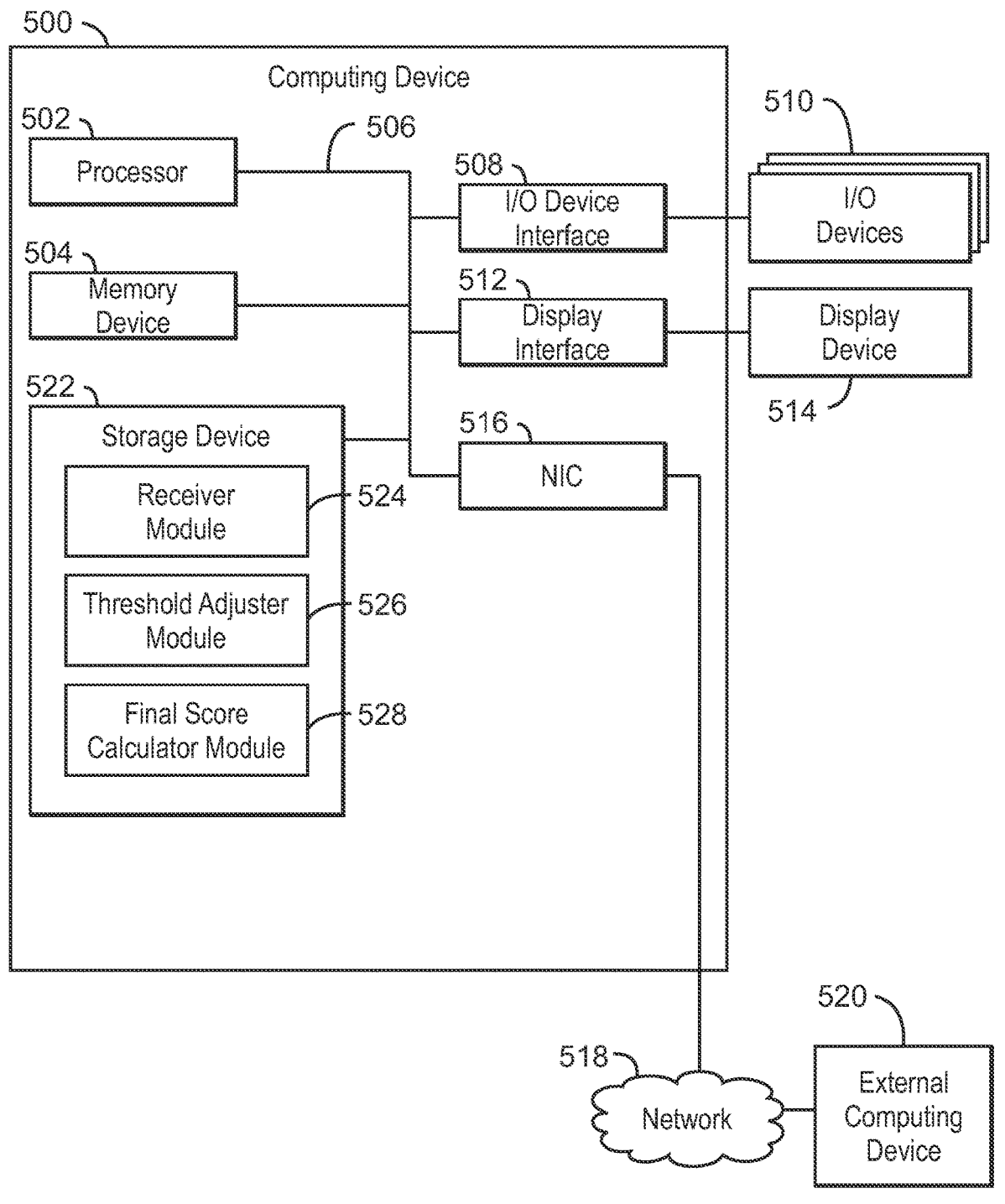
FIG. 5 is a block diagram of an example computing device that can execute ensemble voting classification using adjusted thresholds.

FIG. 5 is block diagram of an example computing device that can execute ensemble voting classification using adjusted thresholds. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external web-server 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a receiver module 524, a threshold adjuster module 526, and a final score calculator module 528. The receiver module 524 can receive training data used to train an ensemble voting classifier. In some examples, the classifiers may be different types of classifiers. In various examples, the classifiers may be of the same type but trained using different parameters during training. In some example, the receiver module 524 may also receive a target sensitivity. For example, the target sensitivity may be 100% or any percentage under 100%. The threshold adjuster module 526 can, for each classifier in the ensemble voting classifier, set a classification score of a positive training item as a threshold. For example, the thresholds may be initially set based on a received target sensitivity. The threshold adjuster module 526 can also adjust a threshold of at least one of the classifiers based on an analysis of a vote contribution of each classifier on the votes on the training data. For example, the threshold adjuster module 526 can adjust the threshold of the at least one of the classifiers to increase a voting specificity without impacting sensitivity with respect to the training data. In some examples, the threshold adjuster 526 can compute a vote for all training items using a current set of thresholds as pointed by an index list. As one example, an initial current set of thresholds may be set at the target sensitivity threshold. For example, index items corresponding to a sensitivity of 100% may be initial used as thresholds. In some examples, the thresholds initially used may correspond to a sensitivity of less than 100% on the training data. In some examples, the threshold adjuster module 526 can freeze classifiers that vote correctly for a positive item that has a sum of positive votes that is one more vote greater than the sum of negative votes from the classifiers. The threshold adjuster module 526 can then, in response to detecting that all classifiers are not frozen, rank non-frozen classifiers by a number of false positives in the vote in descending order, find a smallest threshold index increment to increase a threshold of a classifier to fix at least one false positive, and update a threshold index for the classifier. The final score calculator module 528 can output a final score based on the output of the classifiers with the adjusted thresholds. For example, the final score calculator module 528 can receive input data at the ensemble voting classifier and output a final score based on the output of the classifiers with the adjusted threshold. In some examples, the final score may be based on a simple majority vote of the outputs from the classifiers.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). Furthermore, any of the functionalities of the receiver 524, the threshold adjuster module 526, and the final score calculator module 528 may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver module 524, threshold adjuster module 526, and final score calculator module 528 can be implemented with logic, wherein the logic, as referred to herein, can include any suitable hardware (e.g., a processor, among others), software (e.g., an application, among others), firmware, or any suitable combination of hardware, software, and firmware.

Figure 6:
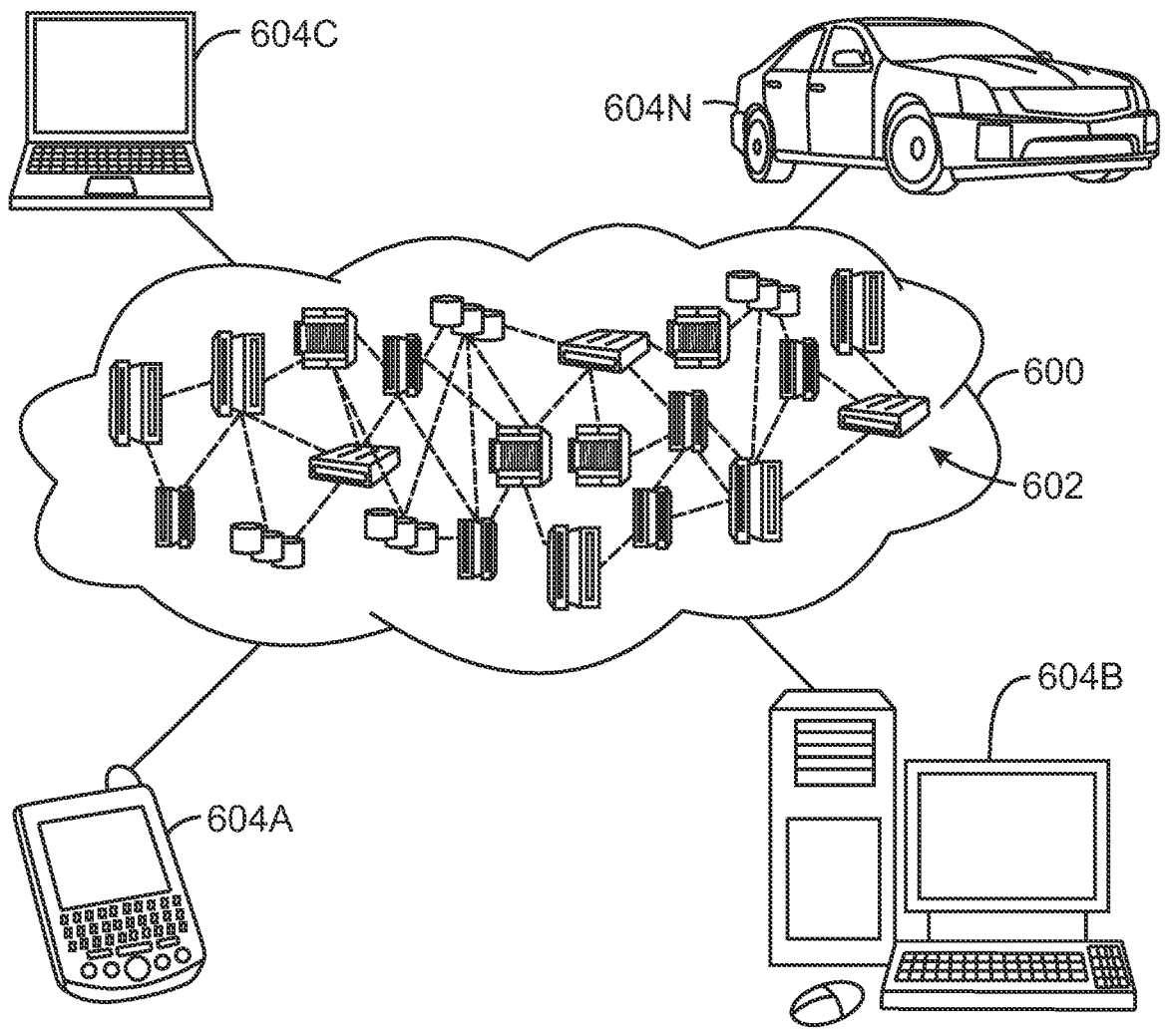
FIG. 6 is a diagram of an example cloud computing environment according to embodiments described herein.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
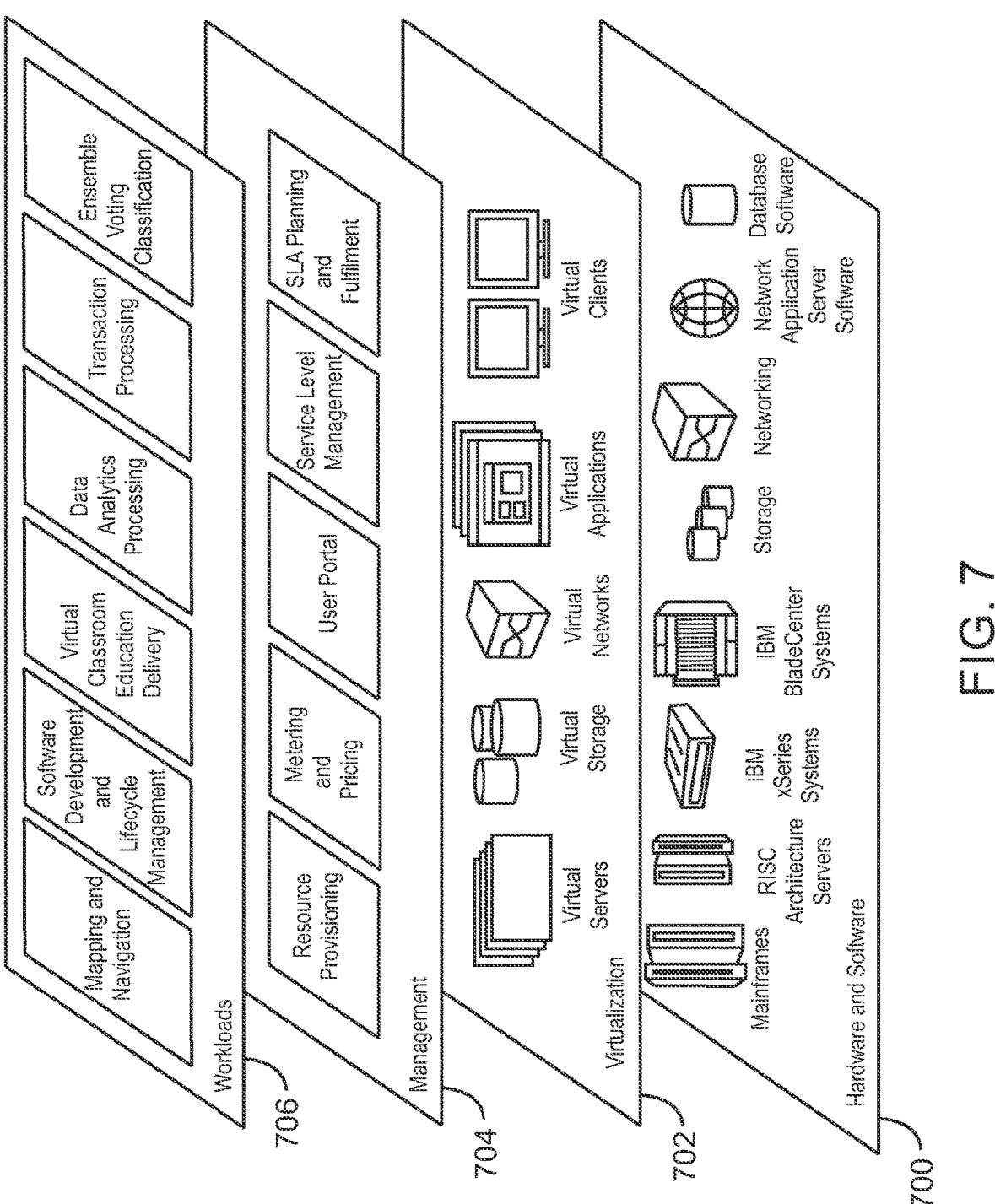
FIG. 7 is a diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 700 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 702 provides an abstraction layer from which the following examples of virtual entities may be provided: virtual servers; virtual storage; virtual networks, including virtual private networks; virtual applications and operating systems; and virtual clients. In one example, management layer 704 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 706 provides examples of functionality for which the cloud computing environment may be utilized. Examples of workloads and functions which may be provided from this layer include: mapping and navigation; software development and lifecycle management; virtual classroom education delivery; data analytics processing; transaction processing; and ensemble voting classification.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
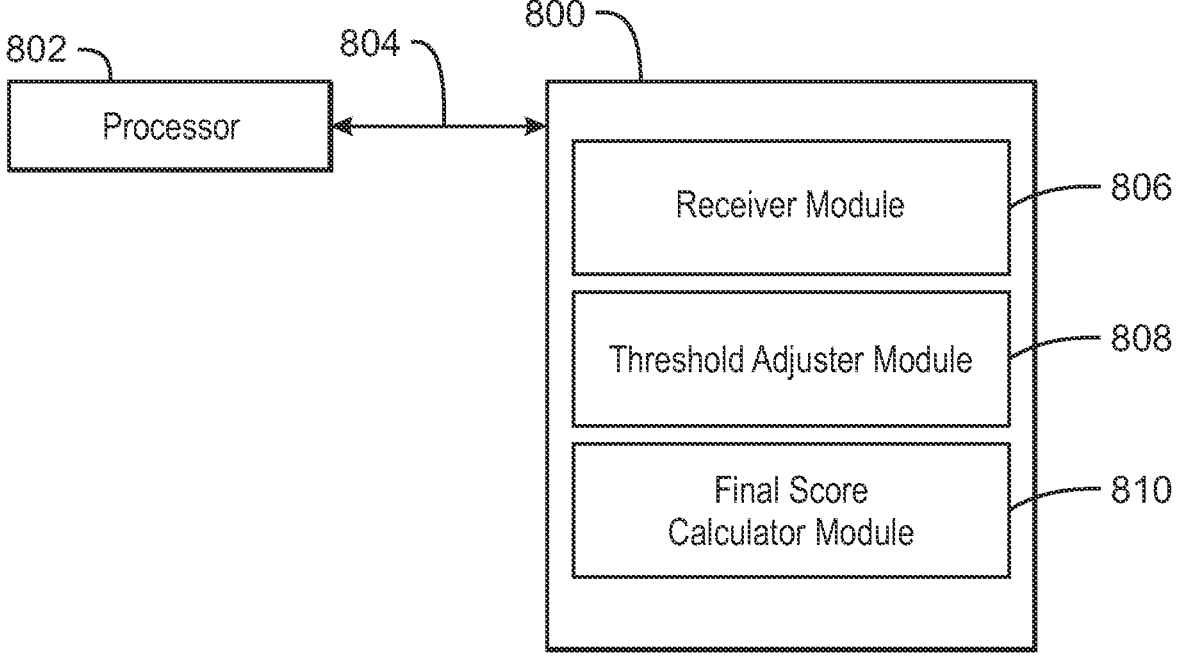
FIG. 8 is an example tangible, non-transitory computer-readable medium that can perform ensemble voting classification using adjusted thresholds.

Referring now to FIG. 8, a block diagram is depicted of an example tangible, non-transitory computer-readable medium 800 that can perform ensemble voting classification using adjusted thresholds. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the methods 200-400 of FIGS. 2-4.

The various software components discussed herein may be stored on the tangible, non-transitory, computer-readable medium 800, as indicated in FIG. 8. For example, a receiver module 806 includes code to receive training data. A threshold adjuster module 808 includes code to generate a threshold table including a sorted listed of thresholds for each of a number of classifiers in an ensemble voting classifier. The threshold adjuster module 808 includes code to set an index into the threshold table to set a threshold for each of the classifiers. The threshold adjuster module 808 further includes code to adjust a threshold index of at least one of the classifiers based on an analysis of a vote contribution of each classifier on votes on the training data. The threshold adjuster module 808 also includes code to compute a vote for all training items in the training data using the set of thresholds as pointed by the threshold index. In various examples, the adjuster module 808 also includes code to freeze classifiers that vote correctly for positive items that have a sum of positive votes of one more than the sum of negative votes from the classifiers. In some examples, the adjuster module 808 also includes code to rank, in response to detecting that all classifiers are not frozen, non-frozen classifiers by a number of false positives in the vote in descending order. The adjuster module 808 also includes code to find a smallest threshold index increment to increase a threshold of a classifier to fix at least one false positive. The adjuster module 808 also includes code to update a threshold index for the classifier. A final score calculator module 810 includes code to receive input test data at the ensemble voting classifier. The final score calculator module 810 also includes code to output a final score based on the output of the classifiers combined using the iteratively adjusted thresholds. In some examples, the final score calculator module 810 also includes code to output the final score based on a simple majority vote of the classifiers. For example, the final score may be a binary classification of 0 or 1 indicating a negative or positive classification for an input test data.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for controlling both voting sensitivity and classifier specificity, the method comprising:

receiving training data;

generating a threshold table including a sorted list of thresholds for each of a number of classifiers in an ensemble voting classifier;

setting an index into the threshold table to set a threshold for each of a plurality of classifiers in the ensemble voting classifier;

adjusting thresholds of the plurality of classifiers based on an analysis of a vote contribution of each classifier of the plurality of classifiers on votes on the training data to increase specificity of each classifier without impacting voting sensitivity with respect to the training data;

computing a vote for training items in the training data using current thresholds as pointed by the threshold table;

freezing classifiers that vote correctly for positive items having a sum of positive votes one more vote greater than a sum of negative votes;

ranking non-frozen classifiers by a number of false positives in a vote in descending order in response to the plurality of classifiers not being frozen;

generating initial thresholds for a threshold index using a genetic algorithm, wherein the genetic algorithm generates random lists of integers for the initial thresholds, evaluates sensitivity and specificity and selects a top k number of integers to use for the initial thresholds, wherein the genetic algorithm finds an optimal combination of indices in a threshold list of the threshold table;

updating the threshold index for a classifier of the plurality of classifiers in response to there being a threshold index increment that increases a threshold enough to fix at least one false positive;

receiving input data at the ensemble voting classifier, wherein the ensemble voting classifier comprises a number of classifiers with thresholds adjusted to increase specificity without impacting sensitivity of the plurality of classifiers with respect to the training data; and generating a final score based on output of the classifiers with adjusted thresholds that achieve maximal classifier specificity in a given voting sensitivity.

2. The computer-implemented method as recited in claim 1 further comprising:

outputting adjusted thresholds and initially frozen thresholds for an ensemble of classifiers in response to the threshold index increment not increasing a threshold to fix at least one false positive.

3. The computer-implemented method as recited in claim 1 further comprising:

outputting adjusted thresholds and initially frozen thresholds for an ensemble of classifiers in response to having all classifiers of the plurality of classifiers being frozen.

4. The computer-implemented method as recited in claim 1 further comprising:

iteratively adjusting thresholds for each of the plurality of classifiers in the ensemble voting classifier.

5. The computer-implemented method as recited in claim 1, wherein training data comprises a set of mammograms comprising x-ray scans including one or more tumors to be classified along with labels indicating whether the one or more tumors are cancerous or benign growths.

6. The computer-implemented method as recited in claim 1, wherein the training data is used to train classifiers.

7. The computer-implemented method as recited in claim 1 further comprising:

adjusting the threshold index of each classifier of the plurality of classifiers to increase specificity of each classifier without impacting voting sensitivity with respect to the training data.

8. A computer program product for controlling both voting sensitivity and classifier specificity, the computer program product comprising one or more computer readable storage mediums having program code embodied therewith, the program code comprising programming instructions for:

receiving training data;

generating a threshold table including a sorted list of thresholds for each of a number of classifiers in an ensemble voting classifier;

setting an index into the threshold table to set a threshold for each of a plurality of classifiers in the ensemble voting classifier;

adjusting thresholds of the plurality of classifiers based on an analysis of a vote contribution of each classifier of the plurality of classifiers on votes on the training data to increase specificity of each classifier without impacting voting sensitivity with respect to the training data;

computing a vote for training items in the training data using current thresholds as pointed by the threshold table;

freezing classifiers that vote correctly for positive items having a sum of positive votes one more vote greater than a sum of negative votes;

ranking non-frozen classifiers by a number of false positives in a vote in descending order in response to the plurality of classifiers not being frozen;

generating initial thresholds for a threshold index using a genetic algorithm, wherein the genetic algorithm generates random lists of integers for the initial thresholds, evaluates sensitivity and specificity and selects a top k number of integers to use for the initial thresholds, wherein the genetic algorithm finds an optimal combination of indices in a threshold list of the threshold table;

updating the threshold index for a classifier of the plurality of classifiers in response to there being a threshold index increment that increases a threshold enough to fix at least one false positive;

receiving input data at the ensemble voting classifier, wherein the ensemble voting classifier comprises a number of classifiers with thresholds adjusted to increase specificity without impacting sensitivity of the plurality of classifiers with respect to the training data; and generating a final score based on output of the classifiers with adjusted thresholds that achieve maximal classifier specificity in a given voting sensitivity.

9. The computer program product as recited in claim 8, wherein the program code further comprises the programming instructions for:

outputting adjusted thresholds and initially frozen thresholds for an ensemble of classifiers in response to the threshold index increment not increasing a threshold to fix at least one false positive.

10. The computer program product as recited in claim 8, wherein the program code further comprises the programming instructions for:

outputting adjusted thresholds and initially frozen thresholds for an ensemble of classifiers in response to having all classifiers of the plurality of classifiers being frozen.

11. The computer program product as recited in claim 8, wherein the program code further comprises the programming instructions for:

iteratively adjusting thresholds for each of the plurality of classifiers in the ensemble voting classifier.

12. The computer program product as recited in claim 8, wherein training data comprises a set of mammograms comprising x-ray scans including one or more tumors to be classified along with labels indicating whether the one or more tumors are cancerous or benign growths.

13. The computer program product as recited in claim 8, wherein the training data is used to train classifiers.

14. The computer program product as recited in claim 8, wherein the program code further comprises the programming instructions for:

adjusting a threshold index of each classifier of the plurality of classifiers to increase specificity of each classifier without impacting voting sensitivity with respect to the training data.

15. A system, comprising:

a memory for storing a computer program for controlling both voting sensitivity and classifier specificity; and a processor connected to said memory, wherein said processor is configured to execute program instructions of the computer program comprising:

receiving training data;

generating a threshold table including a sorted list of thresholds for each of a number of classifiers in an ensemble voting classifier;

setting an index into the threshold table to set a threshold for each of a plurality of classifiers in the ensemble voting classifier;

adjusting thresholds of the plurality of classifiers based on an analysis of a vote contribution of each classifier of the plurality of classifiers on votes on the training data to increase specificity of each classifier without impacting voting sensitivity with respect to the training data;

computing a vote for training items in the training data using current thresholds as pointed by the threshold table;

freezing classifiers that vote correctly for positive items having a sum of positive votes one more vote greater than a sum of negative votes;

ranking non-frozen classifiers by a number of false positives in a vote in descending order in response to the plurality of classifiers not being frozen;

generating initial thresholds for a threshold index using a genetic algorithm, wherein the genetic algorithm generates random lists of integers for the initial thresholds, evaluates sensitivity and specificity and selects a top k number of integers to use for the initial thresholds, wherein the genetic algorithm finds an optimal combination of indices in a threshold list of the threshold table;

updating the threshold index for a classifier of the plurality of classifiers in response to there being a threshold index increment that increases a threshold enough to fix at least one false positive;

receiving input data at the ensemble voting classifier, wherein the ensemble voting classifier comprises a number of classifiers with thresholds adjusted to increase specificity without impacting sensitivity of the plurality of classifiers with respect to the training data; and generating a final score based on output of the classifiers with adjusted thresholds that achieve maximal classifier specificity in a given voting sensitivity.

16. The system as recited in claim 15, wherein the program instructions of the computer program further comprise:

outputting adjusted thresholds and initially frozen thresholds for an ensemble of classifiers in response to the threshold index increment not increasing a threshold to fix at least one false positive.

17. The system as recited in claim 15, wherein the program instructions of the computer program further comprise:

outputting adjusted thresholds and initially frozen thresholds for an ensemble of classifiers in response to having all classifiers of the plurality of classifiers being frozen.

18. The system as recited in claim 15, wherein the program instructions of the computer program further comprise:

iteratively adjusting thresholds for each of the plurality of classifiers in the ensemble voting classifier.

19. The system as recited in claim 15, wherein training data comprises a set of mammograms comprising x-ray scans including one or more tumors to be classified along with labels indicating whether the one or more tumors are cancerous or benign growths.

20. The system as recited in claim 15, wherein the training data is used to train classifiers.

* * * * *